US 10,751,695 B2

United States Patent
Peroni et al.

(10) Patent No.: US 10,751,695 B2
(45) Date of Patent: Aug. 25, 2020

(54) ABSORBENT ELEMENT, ASSEMBLY AND FABRICATION PROCESS

(71) Applicant: TEST 1 S.R.L., Brescia (IT)

(72) Inventors: Giuseppe Peroni, Brescia (IT); Rolando Pellizza, Brescia (IT)

(73) Assignee: TEST 1 S.R.L., Brescia (IT)

( * ) Notice: Subject to any disclaimer, the term of this patent is extended or adjusted under 35 U.S.C. 154(b) by 74 days.

(21) Appl. No.: 15/552,325

(22) PCT Filed: Dec. 28, 2015

(86) PCT No.: PCT/IB2015/060008
§ 371 (c)(1),
(2) Date: Aug. 21, 2017

(87) PCT Pub. No.: WO2016/135546
PCT Pub. Date: Sep. 1, 2016

(65) Prior Publication Data
US 2018/0071715 A1    Mar. 15, 2018

(30) Foreign Application Priority Data
Feb. 26, 2015 (IT) .............................. BG2015A0010

(51) Int. Cl.
B01J 20/04 (2006.01)
B01J 20/20 (2006.01)
(Continued)

(52) U.S. Cl.
CPC ........... B01J 20/262 (2013.01); B01J 20/043 (2013.01); B01J 20/20 (2013.01); B01J 20/261 (2013.01);
(Continued)

(58) Field of Classification Search
CPC .. B01J 20/262; B01J 20/3085; B01J 20/2805; B01J 20/043; B01J 20/3064; B01J 20/20;
(Continued)

(56) References Cited

U.S. PATENT DOCUMENTS

2011/0293374 A1* 12/2011 Mohmeyer ............. C02F 1/681
405/63

FOREIGN PATENT DOCUMENTS

| EP | 1911781 A1 * | 4/2008 | ............. C08G 18/10 |
| EP | 1911781 A1 | 4/2008 | |
| EP | 2390275 A1 | 11/2011 | |

OTHER PUBLICATIONS

Liu et al. "Cost-effective reduced graphene oxide-coated polyurethane sponge as a highly efficient and reusable oil-absorbant" ACS Appl. Mater. Interfaces 2013, 5, 10018-10026 (Year: 2013).*

* cited by examiner

Primary Examiner — Andrew J. Oyer
(74) Attorney, Agent, or Firm — Arent Fox LLP; Michael Fainberg

(57) ABSTRACT

Absorbent element for spilled petroleum or its derivatives comprising an oil-absorbent, hydrophobic and oleophilic material, essentially based on polyurethane foam, having a specific weight in the range of 15-30 g/l and delimiting open cells and closed cells, the latter being in a percentage equal to or lower than 10% of the total cells. The invention further relates to an assembly comprising a plurality of such elements and a method for fabricating an oil-absorbent material.

10 Claims, 5 Drawing Sheets

(51) Int. Cl.
| | |
|---|---|
| B01J 20/26 | (2006.01) |
| B01J 20/28 | (2006.01) |
| B01J 20/30 | (2006.01) |
| C02F 1/28 | (2006.01) |
| C02F 1/68 | (2006.01) |
| C08G 18/10 | (2006.01) |
| C08G 18/08 | (2006.01) |
| C08G 18/16 | (2006.01) |
| C08G 18/18 | (2006.01) |
| C08G 18/20 | (2006.01) |
| C08G 18/40 | (2006.01) |
| C08G 18/46 | (2006.01) |
| C08G 18/48 | (2006.01) |
| C08G 18/69 | (2006.01) |
| C08G 18/76 | (2006.01) |
| C08J 9/14 | (2006.01) |
| C09K 3/32 | (2006.01) |
| C02F 101/32 | (2006.01) |
| C08G 101/00 | (2006.01) |

(52) U.S. Cl.
CPC ..... *B01J 20/2805* (2013.01); *B01J 20/28011* (2013.01); *B01J 20/28045* (2013.01); *B01J 20/3064* (2013.01); *B01J 20/3085* (2013.01); *C02F 1/285* (2013.01); *C02F 1/681* (2013.01); *C08G 18/10* (2013.01); *C08G 18/14* (2013.01); *C08G 18/161* (2013.01); *C08G 18/1808* (2013.01); *C08G 18/1825* (2013.01); *C08G 18/1833* (2013.01); *C08G 18/2063* (2013.01); *C08G 18/4018* (2013.01); *C08G 18/4615* (2013.01); *C08G 18/4837* (2013.01); *C08G 18/696* (2013.01); *C08G 18/7664* (2013.01); *C08J 9/146* (2013.01); *C09K 3/32* (2013.01); *C02F 2101/32* (2013.01); *C08G 2101/005* (2013.01); *C08J 2203/162* (2013.01); *C08J 2205/05* (2013.01); *C08J 2205/052* (2013.01); *C08J 2375/04* (2013.01); *C08J 2375/08* (2013.01)

(58) Field of Classification Search
CPC ............ B01J 20/28045; B01J 20/28011; B01J 20/261; C08G 18/7664; C08G 18/1808; C08G 18/4615; C08G 18/2063; C08G 18/1825; C08G 18/696; C08G 18/161; C08G 18/4837; C08G 2101/005; C08G 18/10; C08G 18/14; C08G 18/4018; C08G 18/1833; C08G 2101/04; C08J 9/146; C08J 2203/162; C08J 2375/04; C08J 2205/052; C08J 2205/05; C08J 2375/08; C09K 3/32; C02F 2101/32; C02F 1/285; C02F 1/681
See application file for complete search history.

FIG.1

| INGREDIENTS COMPONENT POLYOL | FORMULATION 1 | FORMULATION 2 | FORMULATION 3 | FORMULATION 4 | FORMULATION 5 | FORMULATION 6 | FORMULATION 7 | FORMULATION 8 | NOTES |
|---|---|---|---|---|---|---|---|---|---|
| PDMS-g-HTPB POLY-BD-R45HTLO RESIN | 100 | | 30 | 43.3 | 50 | 30-40 | 30-40 | | |
| LUPRANOL 1341- PO/EO trifunctional glycol -OH | | 43.3 | 40 | 30 | 22 | 22 | 40-50 | | |
| Polyester produced from c-18 oleic (stearic..) + diethanolamin | | 43.3 HDF | | | | | | | |
| GRAFT-polyol Pluracol | | | 13.3 | 13.3 | 25 | 25 | | | |
| LUPRANOL 2047 CELL OPENER HIGH CONTENT OF EO FUNCTIONALITY | | | 3,3 | | 3 | 3 | 5 | | |
| Grafted prepolymer from synthesis with Styrene | | | | | | | 5-15 | | |
| Treatment with graphene and/or indole and/or PTES | | | | | | | 1-5 | | |

(FIG.1 - continued)

| | | | | | | | | |
|---|---|---|---|---|---|---|---|---|
| AMINE CATALYSIS | | | | | 0.8-1.5 | 0.8-1.5 | 0.8-1.5 | 0.8-2 |
| CELL REGULATOR DEOA | | | | | 0.2-0.8 | 0.2-0.8 | 0.2-0.8 | 0.2-1 |
| PURE DIETHANOL AMINE | | 0.8 | 1 | | | | | |
| DABCO 33LV CATALYST BLOWING AGENT | 3 | | 0.6 | | | | | |
| NIAX A-1 CATALYST | 1.5 | | 0.08 | 1.5 | | | | |
| POLYCAT 77 CATALYST | | | 0.8 | | | | | |
| DABCO T9 CATALYST - GELATION | 0.5 | | | | | | | |
| NIAX L.580 EMULSIFIER | 4 | | | | | | 0.2-0.4 | |
| TEGOSTAB B 8708 OR B4690 EMULSIFIER | | | 0.2 | | | | 0.2 | 0.2 |
| DC190 SILICON + STAB. | 2.6 | | 2.4 | 2.5 | | | 1.5-2.5 | 2-2.6 |
| RECOVERY | | | | | | 5-10 | | |
| DISTILLED WATER BLOWING AGENT | 1-3 | | 3 | 3 | 2.7 | 2.7 | 2.7 | 3 |
| BLOWING AGENT DPO/GWT=0 | 6-27 | | 4-25 | 5-25 | 25-27 | 25-27 | 20-30 | 6-25 |
| NCO (WT%) = 31.5 Lupranat R2500U | INDEX 1.05 | | 3 | 4 | 90-110 index | 90-110 index | Index | 70-130 index |
| | | | | | | | | Dow-Corning |

(FIG.1 - continued)

| | | | | 50 PREP. 26%-NCO | 50 PREP. NCO 26% | 50 PRE- NCO 26% | 63 prep NCO 23% | 50 prepol NCO 22% | |
|---|---|---|---|---|---|---|---|---|---|
| Crude mixture of MDI and polymethylene-polyphenyl | 200 | 200 | 200 | | | | | | |
| RESIN | | | | 100 | 100 | | | 100 | |
| RESIN ELASTW51657137 | | | | | | | | 50 | |
| ISO 145/22 (1.mi/LM20) 1/1 | | | | | | | | 10 | |
| Lupranol 4895- 25N ohv2 6 m pa.s2280 | | | | | | | | 20 | Mw 1000 |
| Lupranol 1100 ohv 55 m.pa.s 330 | | | | | | | | 30 | Mw 4000 |
| Lupranol 2048 ohv 41 m.pa.s 1000 | | | | | | | | 40 | Mw 4800 |
| Lupranoll 2095.ohv-35 m pa.s 850 | | | | | | | 20 | 28 | |
| Specific weight of the foam kg/m3 | 30 | 22 | 20 | 24 | 26 | | 20 | | |

FIG.2

| Sample size | 100x100x2.5 mm | 1 | 2 | 3 | 4 | 5 | 6 | 7 | 8 |
|---|---|---|---|---|---|---|---|---|---|
| Sample weight | grams | 8,52 | 6,82 | 6,25 | 5,68 | 6.82 | 6,25 | 5,68 | 7,96 |
| Container saltwater oil | 20x40 cm | | | | | | | | |
| Quantity crude oil or derivatives | 2-3 mm | | | | | | | | |
| Quantity saltwater | 60mm | | | | | | | | |
| QUANTITY ABSORBED WATER G. SORBENT/G. ABSORBED WATER | To saturation grams Times: 3' temperature 25 °C | 2.51 | 3 | 3 | 2.8 | 3.1 | 3.2 | 1.2 | 3.1 |
| 1-oil type 10W40 ABSORBED RATIO G. SORBENT/G. ABSORBED OIL | To saturation Times: average value of 5 cycles | 28 6' | >25 5'40" | >25 5'30" | 30 4'30" | 30 4'50" | 29 4'50" | 31 5' | 34 5'30" |
| 2-Light Crude Oil Ratio g. sorbent/g adsorbed oil | To saturation Times: average value of 5 cycles | 29 5'30" | 30 5'25" | 29 5'20" | 29 4'50" | 28 5' | 28 5'20" | 30 5' | 33 5' |
| 3-Heavy crude oil Ratio g sorbent/g adsorbed oil | To saturation Times: average value of 5 cycles | 30 5' | 31 5'45" | 32 6' | 30 5' | 30 5'40" | 30 6' | 32 6' | 32 6' |
| 1-oil type 10W40 ABSORBED RATIO G SORBENT/G ADSORBED OIL | In 2' Temperature 25 °C | 26 | 24 | 24 | 26 | 25 | 24 | 30 | 29 |

(FIG.2 - continued)

| | | | | | | | | | |
|---|---|---|---|---|---|---|---|---|---|
| 2-Light Crude Oil Ratio g. sorbent/g. adsorbed oil | In 2' Temperature 25 °C | 25 | 26 | 24 | 25 | 23 | 23 | 28 | 28 |
| 3-Heavy crude oil Ratio g. sorbent/g. adsorbed oil | In 2' Temperature 25 °C | 26 | 27 | 27 | 26 | 25 | 25 | 30 | 27 |
| Adsorption values temperature tests for products 1,2-3<br>1 = Oil 10W40<br>2 = Saudi Arabian light crude oil<br>3 = Venezuelan heavy crude oil | 4 °C | 28<br>26<br>30 | >25<br>29<br>30 | >25<br>29<br>31 | 30<br>29<br>30 | 30<br>28<br>30 | 29<br>28<br>30 | 31<br>30<br>32 | 34<br>33<br>32 |
| Specific weight kg/m3 | kg/m3 | 30 | 24 | 22 | 20 | 24 | 26 | 20 | 28 |
| Compression test at 70% compression | 70% compression for 24 h | <3 | <7 | <7 | <6 | <5 | <6 | <3 | <3 |

ABSORBENT ELEMENT, ASSEMBLY AND FABRICATION PROCESS

This application is a National Stage entry of International Application No. PCT/IB2015/060008, filed Dec. 28, 2015, which claims priority to Italian Patent Application No. BG2015A000010, filed Feb. 26, 2015. The disclosures of these priority applications are incorporated in their entirety herein by reference.

BACKGROUND OF THE INVENTION

This invention relates to an absorbent element for spilled petroleum, an oil-absorbent material and a fabrication process for an oil-absorbent material.

DESCRIPTION OF PRIOR ART

Oil spills can occur during the transportation and/or storage of petroleum and its derivatives, for example in the open sea, in lakes or rivers and in correspondence of their respective shores and banks, ports or offshore platforms, causing enormous environmental contamination with negative impacts on the ecosystem.

Although accidents of this kind have been occurring for decades, there is a need to provide an absorbent material that is efficient with any type of petroleum (in terms of both quality and quantity of contamination) and that performs in all environmental situations, temperatures and atmospheric conditions.

In addition to this, a material suitable for absorbing oil spills must be able to combine, purely by way of example, good buoyancy even after impregnation with the oil, a good capacity to retain the absorbed oil inside it and a reduced "dry" density so as to be easily transportable.

Currently, large areas contaminated by petroleum are cleaned using containment barriers that partially reduce contamination enlargement, associated to aspirators of a water-rich water-petroleum mixture and to separator systems that require large storage volumes and a significant input of separation energy in order to isolate the oil.

The materials currently used for this purpose, for example inorganic expanded perlite, of plant origin, synthetic polymers and/or foams of different type, prove unsatisfactory from a plurality of points of view.

Document U.S. Pat. No. 3,886,067 teaches to use (semi-) rigid blocks of polyurethane foam to absorb spilled oil, where these blocks are thrown into the sea and, after a saturation time, dragged ashore for the recovery of the absorbed oil.

This earlier system is unsuitable for use in open sea, especially in rough sea, since the aforesaid blocks would rapidly disperse over a wide area making them difficult to recover. Even the high density of these earlier blocks makes the associated transport logistics disadvantageous. Finally, the dragging and/or lifting of the oil-soaked blocks promotes a rapid leakage of previously absorbed oil.

SUMMARY OF INVENTION

This invention fits into the previous context, proposing to provide an innovative absorbent material, able to combine excellent buoyancy, even when soaked with oil, a high internal volume for absorption of the oil, and a marked resistance to the desorption of such oil, for example during recovery of the material from the polluted water body.

This purpose is achieved by means of an absorbent element for spilled petroleum or its derivatives comprising an oil-absorbent, hydrophobic and oleophilic material, essentially based on polyurethane foam, having a specific weight in the range of 15-30 g/l (preferably 15-25 g/l) and delimiting open cells and closed cells. The closed cells are in a percentage equal to, or less than, 10% of the total cells.

In this way, innovatively, the above-mentioned presence of open cells allows obtaining a rapid penetration of the oil into the oil-absorbent material, and the subsequent desorption as a result of mechanical stress is considerably reduced compared to the polyurethane materials of the prior art.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1 is a table illustrating compositions of eight different formulations of oil-absorbent material, in accordance with aspects of the present disclosure.

FIG. 2 is a table including control test information for the eight different formulations, in accordance with aspects of the present disclosure.

DESCRIPTION OF PREFERRED EMBODIMENT

It should be clarified that, even though in this description the term "petroleum" is used in a substantially exclusive manner, this term will refer to any petroleum derivative or mixture of petroleum derivatives with substantial characteristics of hydrophobicity and, preferably, with features of lower density than water.

According to a particularly preferred variant, the percentage of open cells is between 92-99% of the total cells.

For example, the above element may be of a flat or substantially cylindrical shape.

According to a variant, the length of the absorbent element could be between 1-5 metres, or between 1-10 metres.

According to a further variant, the length of the absorbent element could be several tenths or hundreds of metres.

Preferably, adsorbed at the surface of the open cells, the oil-absorbent material comprises polypyrrole, graphene, calcium carbonate or mixtures thereof in order to improve the oleophilia of said material.

Optionally, the oleophilia of the aforesaid oil-absorbent material could be improved with at least one of the following treatments:

i) with external treatments by adsorption of polymerised pyrrole ($C_4H_5N$) in the presence of ferric chloride at 100° C. to obtain polypyrrole;

ii) through the use of nano-fillers, such as graphene, stuck on the outer surface of the open cells;

iii) through a synthesis through a pre-polymer in which part of any diphenylmethanediisocyanate possibly present is blocked by styrene monomers, acrylics, acrylonitrile or their copolymers;

iv) through a mixture of polyether polyols of ethylene oxide (EO) and/or propylene oxide (PO) with molecular weights between 1000 and 6000 with grafted polyethers;

v) with acrylates of acrylonitrile in the presence of a polyol on a butadiene rubber base.

According to a particularly advantageous variant, the oil-absorbent material may be at least partially contained within an outer wrapper made of a non-woven fabric of average density between 100-200 g/m2.

For example, the non-woven fabric may comprise fibres of polypropylene optionally blended with styrenic fibres, the latter for example with a diameter of 6-14 micrometres.

Preferably, the oil-absorbent material and the outer wrapper are mutually glued by means of at least a hot-melt adhesive.

According to a further variant, the oil-absorbent material may be contained in a polyolefin fibre or biodegradable fibre netting, preferably with a tubular shape.

According to a still further variant, the absorbent element may include at least a rope or a reinforcing tape that extends along the extension direction of this element, in order to increase at least the relative tensile strength.

According to an embodiment, the tape or rope may be at least partially incorporated within the oil-absorbent material.

According to another embodiment, the tape or rope may be at least partially glued to the surface of the oil-absorbent material.

Preferably, a plurality of absorbent elements of the aforesaid type could be joined in an assembly in an articulated and releasable manner, for example to adapt to any possible wave motions, to create an assembly of desired capacity and/or to separate any damaged elements.

According to a variant, the length of such assembly could be several tenths or hundreds of metres.

For example, a desired length of the assembly could be obtained through the connection of a plurality of absorbent elements with a length comprised between 1-5 metres, or between 1-10 metres.

Merely by way of example, each outer wrapper or each netting could comprise complementary means for modular interconnection to other wrappers or other nettings.

According to a preferred embodiment, the tape or rope mentioned above may be at least partially glued or attached to the outer wrapper or to the netting.

The above objectives are further solved by a process for the fabrication of an oil-absorbent, hydrophobic and oleophilic material, essentially based polyurethane foam.

Since this material is of the type illustrated above, preferred or advantageous variants of the process may include any characteristic implicit or explicit from the above description.

Such a process comprises a step of reaction between:
one or more poly-isocyanates;
one or more poly-oils or one or more compounds containing reactive hydrogens;
at least one oleophilic nano filler, for example, graphene, or at least one oleophilic polymer such as poly-pyrrole;
at least one cell-regulator emulsifier;
at least one amine catalyst; and
as expander, water and optionally at least one fluoro-derivative compound.

According to advantageous variants, the aforesaid reaction step could be conducted by pre-polymer technique, or by one-shot technique.

According to an embodiment, the polyisocyanate could be selected from the group consisting of 2,4-toluene diisocyanate, 2,6-toluene diisocyanate, 2,4'-diphenylmethane diisocyanate, 4,4'-diphenylmethane diisocyanate, 2,2' diphenylmethane diisocyanate, hexamethylene diisocyanate, 1,5-naphthalene diisocyanate, xylylene diisocyanate, polymethylene polyphenyl polyisocyanate or mixtures thereof.

According to a further embodiment, the polyol it could be selected from the group consisting of polyester polyols, polyether polyols, grafted polyols, special polyols or mixtures thereof.

In a particularly advantageous variant, the polyol comprises a mixture of at least one polyether polyol and at least one grafted polyol in a ratio of about 65/35, the polyether polyol having an hydroxyl number of about 55, the grafted polyol containing about 25% polystyrene, 10% polyacrylonitrile and about 65% ethylene oxide (EO) and/or propylene oxide (PO).

More precisely, the polyether polyols may be linear or branched with a molecular weight in the range 1000-6000, and may comprise a number hydroxide functionalities between 15-900, for example between 30-150.

Preferably, the polyether polyols may be obtained by reaction of alkylene oxides with 2-4 carbon atoms in the alkylene radical with a starter molecule containing at least two reactive hydrogens.

The alkylene oxides may include, in particular, tetrahydrofuran, 1,2 butylene oxide, 2,3 butylene oxide, propylene oxide and ethylene oxide, or combinations thereof. According to a particularly advantageous variant, a PO/EO mixture could be used in a ratio of 70/30 or 80/20.

Regarding possible starter molecules usable for the oxides cited above we mention, for example, from water to dicarboxylic acids (both aliphatic and aromatic such as adipic acid and terephthalic acid), preferably polyhydric alcohols starting from ethylene glycol to glycerine up to pentaerythritol, sorbitol and sucrose.

According to a particularly preferred variant, the polyether polyols used may be bifunctional and trifunctional PO/EO such as standard lupranol 2084 polyether polyol from BASF, and BASF balance 50 polyol obtained from renewable sources with molecular weights from 2000 to 6000 with intrinsic hydrophobicity and good resistance to hydrolysis.

These polyols may be used in a mixture with polyether polyols grafted for their good oleophilia.

For example, grafted polyether polyols may be those described in document U.S. Pat. No. 4,670,477. These are polyether polyols (such as PO/EO) in which polystyrene-acrylonitrile-san-polyurea-polyacrylates is dispersed.

For example; the grafted polyols are produced and marketed by several chemical companies under different chemical names, as summarised below:
Bayer: "polymeric polyol" modified with polystyrene (hs 100) or polyurea (E9232);
BASF: sold as "graft polyol" modification with polystyrene and/or polyacrylonitrile "(p9941v-p1442-p1443);
Dow Chemical: sold as "co-polymer polyol" modification with polystyrene and/or polyacrylonitrile" (3943).

With regard to the variant with special polyols, these are polyols that, in a mixture with standard polyether polyols (preferably di- and tri-functional from PO/EO with molecular weight 1000-6000), provide excellent hydrophobicity and a high oleophilia with high tensile properties and resistance to hydrolysis.

The special polyols preferred for the purposes of this invention are the following a) and b):
a) ester obtained by esterification of a linear aliphatic acid with 10-20 carbon atoms in the molecule, saturated or unsaturated, with an alcohol with 2-20 carbon atoms in the molecule. The ester that is obtained is an oleophilic ester whose properties will be taken from the reaction product of this polyester with the isocyanate.

Example typical of these fatty acids are: palmitic acid, stearic acid, oleic acid and mixtures thereof.

b) liquid polybutadiene homopolymer with hydroxyl groups (poly-butadiene or poly-bd such as r45htlo from Cray. Valley) that react with di- and poly-isocyanates in order to obtain an oil-absorbent material of high resilience and elastic return.

Furthermore, in this variant, the poly-butadiene base of the foam obtainable leads to a product with properties that are valid in a wide range of temperatures, especially at low temperatures.

Advantageously, the hydrophobic body of the poly-butadiene provides excellent resistance to the hydrolysis of the final expanded superior to that of any other product currently used.

In regard to the cell-regulator emulsifiers, they help to control the time and the degree of opening of the cells of the polyurethane foam.

Preferably, the emulsifiers may include siloxane copolymers/polyalkylene oxides. For example, these emulsifiers may be obtained from producers such as Goldschmidt Chemical Corp. and Qsi Air Products and Chemicals Inc.

For the purposes of this invention, cell-regulator emulsifiers containing an Si—C bond stable to hydrolysis are preferred.

In addition to that, hydrophobic cell-regulator emulsifiers that able to induce hydrophobia in the oil-absorbent material are preferred.

The cell-regulator emulsifiers that could be used include, for example:

Goldschmidt Chemical Corp.: b8110, b8240, b8870;
Osi: 1626, 16164;
Air Products and Chemicals: dc5604-dc 5598.

With regard to the catalysts, it is preferable to discard the use of organic-metallic catalysts to avoid contamination of the water with damages to fish.

Tertiary-amine-based catalysts are preferred. Merely by way of example, triethylamine, triethylene diamine, ethanolamine, diethanolamine, propanolamine, triethanolamine, ethylenediamine and other aliphatic amines or mixtures thereof could be used.

In relation to the blowing agents, water is a particularly preferred variant.

Optionally, as an expansion adjuvant, along with the water there may be present at least one fluoro-derived. compound, preferably having ODP (ozone depletion potential) and GWP (global warming potential) substantially corresponding to zero.

Preferably, the fluoro-derived compound comprises or consists of 1,1,1,4,4,4 hexafluoro 2-butene ($CF_3CH=CHCF_3$). For example, this product is known under the trade name FEA 1100, sold by E.I. Du Pont De Nemours and Company.

Optionally, to obtain the specific weight indicated, liquid $CO_2$ may also be used in the procedure.

According to a still further variant, to obtain the aforesaid oil-absorbent material, there may also be present one or more of at least one UV light absorber, at least one antioxidant, at least one flame retardant (for example trichloroethyl phosphate-chlorinated paraffins, bromine-based compounds such as pentabromodiphenyl oxide) and at least one cross-linking agent or mixtures thereof.

The purpose of this invention will now be illustrated on the basis of non-limiting examples.

Example 1: Preparation of the Oil-absorbent Material Using the Pre-polymer Technique In the expansion process via pre-polymer the hydroxyl compound is reacted with an excess of isocyanate (NCO/OH ratio about 2:1) forming a pre-polymer with terminal free isocyanate in defined amount. This compound will be defined as pre-polymer (A).

A compound containing 100 parts by weight of polyols and catalysts, emulsifiers, cell regulators, pigments, water, blowing agents, fillers and any other additives will be called compound (B).

The value of the sum of the equivalent weights of the compound (B) will require an equivalent weight of pre-polymer (A) and, after fast mixing—between 8 and 16 seconds—of the two components, the mixture that is not yet in cream time is discharged in a mould wherein it will reach the desired volume after several minutes and the cross-linking of the foam in the next 48 hours for cutting operations to be started.

The stoichiometric ratio (A)/(B) provides an index of the isocyanate pre-polymer equal to 100. The variation above or below the value of the isocyanate with respect to the stoichiometric amount required by the properties of the foam is referred to as "NCO-index".

The isocyanates employable in this example are: diphenylmethanediisocyanate (MDI) in its isomeric forms 2,4'-, 4,4'-2,2', hexamethylene diisocyanate, 1,5-naphthalene diisocyanate, polymethylene polyphenyl polyisocyanate, polyfunctional isocyanates obtained by the dimerisation or trimerisation reaction or containing urethane groups, or mixtures thereof.

The use of technical grade mixtures of diphenylmethane diisocyanate and polymethylene polyisocyanate (crude MDI) is preferred. The MDI index, which is the ratio of the amount used in the formulation and the theoretical stoichiometric amount can vary between 75 and 125.

Example 2: Possible Formulations of the Oil-Absorbent Material According to this Invention Eight different formulations of oil-absorbent material were prepared according to this invention, whose compositions are summarised in FIG. 1.

After obtaining them, these materials were tested as discussed in Example 3.

Example 3: Control Tests for Absorption of Oil and Salt Water (25g NaCl in 1000 cc of Water) of the Samples of Example 2

The values reported in accompanying FIG. 2 correspond to an average obtained on three different samples.

From the consideration of this table, it appears evident that the oil-absorbent material, in addition to possessing an advantageous ratio between closed cells and open cells, further presents a high degree of hydrophobia with an equally high oleophilia (exceeding thirty times the weight of the absorbent material).

Innovatively, the absorbent element of this invention is able to brilliantly overcome the drawbacks noted in relation to the prior art.

More precisely, this element has excellent buoyancy in water both before and after contact with and absorption of petroleum, is configured—not only by virtue of its own cells—to allow easy access and penetration of the oil, but also to resist desorption of the oil during removal from the water.

Advantageously, the absorbent element of this invention has a surface tension that allows it to be both hydrophobic and oleophilic.

Advantageously, the absorbent element of this invention selectively absorbs the oil but not the water of the water body to be reclaimed, despite the presence of open cells.

Advantageously, the absorbent element of this invention has a marked ability to reduce the enlargement of the oil spilled in water.

Advantageously, the absorbent element of this invention is characterised by a high rate of oil absorption, so as to prevent an undesirable mixing of oil and the water body.

Advantageously, the absorbent element of this invention is distinguished for a high solid-liquid contact surface, as well as an equally marked ratio of absorbent material weight/weight of adsorbed oil.

Advantageously, the absorbent element of this invention is designed to allow a remarkable ease of separation of the oil from the absorbent material so as to allow the recovery of the oil spill and reuse of the absorbent material.

Advantageously, the absorbent element of this invention has low weight and ease of transport with reduced volumes.

In fact, not only by virtue of the compression set (evaluated according to ASTM D395) that characterises it, the absorbent element described allows it to be transported under vacuum with an extremely reduced total volume, but it quickly resumes its internal volume in order to perform its absorbent function.

It follows that this element is a candidate to be, for all effects, standard safety equipment for all structures used for the transportation, extraction or processing of petroleum and its derivatives.

Advantageously, the absorbent element of this invention has high mechanical properties, so that it can be dragged and literally "squeezed" to cause the exit of the oil from the cells.

Therefore, advantageously, following the above mentioned squeezing, the element is once again available for a new absorption cycle.

Advantageously, the aforesaid material is designed to withstand not less than five cycles of squeezing and re-use.

Advantageously, the compression set of the absorbent element of this invention allows drastically reducing the volume transported, resuming its original shape after the oil has been removed by the procedure mentioned above.

Advantageously, the use of a wrapper or netting allows making the absorbent material and the related covering work synergistically, so as to considerably increase the mechanical properties of the absorbent element of this invention.

Advantageously, the use of tapes or ropes in the manner described allows discharging part of the draft forces to structures other than the oil-absorbent material, so as to avoid an unintentional squeezing of the oil, and reducing the risk of lacerations of the material.

Advantageously, the modular system described above allows obtaining an assembly of variable length depending on the contingencies, for example based on the magnitude of the contaminated area to be reclaimed or the volume of spilled oil.

In addition to this, the element described above allows a rapid replacement of the absorbent areas that are deteriorated or damaged, allowing an easy recovery of absorbent capacity.

Advantageously, the absorbent element of this invention even allows the use of waste from the production of the absorbent material.

Advantageously, the use of technical grade mixtures of the polyisocyanates described above has proved to be favourable both for toxicological reasons and for convenience of use.

To the embodiments of the aforesaid element, oil-absorbent material and process, one skilled in the art, in order to meet specific needs, may make variants or substitutions of elements with others functionally equivalent.

Even these variants are contained within the scope of protection; as defined by the following claims.

Moreover, each of the variants described as belonging to a possible embodiment can be realised independently of the other variants described.

The invention claimed is:

1. An absorbent element for spilled petroleum or its derivatives comprising an oil-absorbent, hydrophobic and oleophilic material, essentially based on polyurethane foam, having a density in the range of 15-30 g/l and delimiting open cells and closed cells, wherein the closed cells are in a percentage equal to or lower than 10% of the total cells, wherein the polyurethane is a polymer of a polyisocyanate and polyols, wherein the polyisocyanate is grafted with styrene monomers, acrylics monomers, acrylonitrile monomers or copolymers thereof.

2. The element according to claim 1, wherein the percentage of open cells is between 92-99% of the total cells, and wherein the density is in the range of 15-25 g/l.

3. The element according to claim 1, further comprising polypyrrole, graphene, calcium carbonate, or mixtures thereof, adsorbed at the surface of the open cells of the oil-absorbent, hydrophobic and oleophilic material, in order to improve the oleophilia of said material.

4. The element according to claim 1, further comprising at least a reinforcement cord or tape that extends along the predominant direction of extension of this element, in order to increase at least its tensile strength, said cord/tape being at least partially incorporated in the oil-absorbent material or at least partially glued to the surface of said material.

5. The element according to claim 1, wherein the oil-absorbent material is at least partially contained in an outer wrapper of non-woven fabric of average density between 100-200 g/m$^2$, said non-woven fabric comprising polypropylene fibres optionally mixed with styrene fibres.

6. The element according to claim 5, wherein the oil-absorbent material and the outer wrapper are glued by means of at least a hot-melt adhesive.

7. The element according to claim 1, wherein the oil-absorbent material is contained in a polyolefin fibre or biodegradable fibre netting.

8. An assembly comprising a plurality of absorbent elements according to claim 5, joined together in an articulated and releasable manner, each outer wrapper or each netting comprising complementary means for modular interconnection with other wrappers or nettings.

9. The element according to claim 1, wherein the element has a flat or substantially cylindrical shape.

10. The element according to claim 1, wherein the element has a length of 1 to 10 meters.

* * * * *